3,393,969
FIBROUS CELLULOSIC DIAZONIUM SALTS AND
METHOD OF PREPARATION
Ricardo H. Wade, Metairie, and Tyrone L. Vigo, New
Orleans, La., assignors to the United States of America
as represented by the Secretary of Agriculture
No Drawing. Filed Aug. 26, 1964, Ser. No. 392,353
15 Claims. (Cl. 8—116.2)

A nonexclusive, irrevocable, royalty free license in the invention herein described, throughout the world for all purposes of the United States Government, with the power to grant sublicenses for such purposes, is hereby granted to the Government of the United States of America.

This invention relates to dry, stable, chemically reactive cellulose salts. More specifically, it relates to dry, stable, chemically reactive cellulose diazonium salts useful in a wide variety of commercial reactions including coupling with arylols to form dyes, formation of free radicals to initiate graft polymerization of monomers, crosslinking, and the like. Still more specifically, the invention relates to a method for the preparation of the cellulose-diazonium salt. The resultant product is not physically damaged by the process.

The term cellulose, as used herein, includes fibrous materials such as cotton, regenerated cellulose, flax, hemp, ramie, partially substituted cellulose, wood, etc. It may be in the form of fibers, yarns, fabric, webbing, paper, and the like.

The term cellulose diazonium salt, frequently referred to below as "diazo-cellulose" signifies a diazonium salt chemically attached to the cellulose molecule by replacement of a hydrogen atom in a hydroxyl group. The "salt" may be the anion of an organic or inorganic acid. As so defined, the "diazo-cellulose" is a dye component per se and, upon coupling with suitable arylols, or colored anions, produces a dye chemically combined with cellulose. The term "fiber-dye" is frequently used below to describe such colored products.

The term "cellulosate" relates to a cellulose molecule in which at least one hydrogen atom has been replaced by the diazonium salt and is referred to below as Z—O—.

The term "arylols," as used herein, includes phenols, naphthols, substituted phenols or naphthols, etc., which may be coupled to the diazo-cellulose to produce colored products which are commercially acceptable.

Fiber-reactive dyes have been produced by Guthrie (U.S. Patent No. 2,741,532). In this process diazotized and developed colors containing a halogen or an ethyl sulphuric acid constituent on the color base were admixed with an aqueous alkali of mercerizing strength and applied to chemically unmodified cellulose. The excess dye alkali solution was then removed, the cellulose dried and subjected to a curing operation by heating to a temperature of about 100–120° C. for a period of time. During this treatment, the halogen or sulphuric acid substituent combined with the hydrogen atom of one or more of the hydroxyl groups of the cellulose thereby forming an ether linkage. The process produced a wash-fast, colored cellulose.

Groemacher in German Patent No. 551,863 etherified cellulose with aromatic nitrohalides followed by reduction of the nitro group to the amino group which he then, in a continuous process *without drying*, diazotized and coupled with phenols and other arylols to produce colored products.

Reeves and Wade (U.S. Patent No. 2,926,063) prepared orthoamino benzoate esters of cellulose which subsequently could be diazotized and coupled with phenols and arylols in a continuous process *without drying*, to produce colored products.

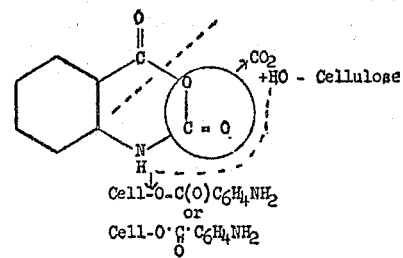

Cell–O–C(O)C$_6$H$_4$NH$_2$
or
Cell–O·C·C$_6$H$_4$NH$_2$
      ‖
      O

These esterified products, while almost physically indistinguishable from untreated fabric, exhibit many superior properties when compared with the untreated fabric.

None of these references disclose the possibility of diazotizing the amine attached to the cellulose-ether or cellulose-ester group, thereafter drying the diazotized product and, subsequently coupling the dry diazo-cellulose with arylols in aqueous solution.

We have now found that the anthranilate ester of U.S. Patent No. 2,926,063 may be diazotized at elevated temperatures to form a diazonium salt which may then be washed to remove excess reactants and dried without decomposition of the —N=N—Y group. This was unexpected.

The product produced by the process of this invention is a cellulose-diazonium-salt (diazo-cellulose) of the formula $$Z-O-\overset{O}{\underset{\|}{C}}-\overset{R}{\underset{|}{A}}-N\overset{+}{\equiv}\overset{-}{N}Y$$

where Z—O is a cellulose, that is, at least one hydrogen atom has been removed from the cellulose molecule; Y is an acid anion, such as acetate, trifluoroacetate, citrate, chloride, oxalate, etc.; A is aryl, such as phenyl and naphthyl; substituted aromatics; aliphatic hydrocarbons; etc.; and R is hydrogen, nitro, and halogen such as chlorine.

The dry diazo-cellulose is quite stable. It may be kept for days, weeks, or months without obvious chemical change and then coupled to arylols to form colored fibers (fiber dyes). As noted above, no obvious physical damage is imparted to the cellulose.

It is an advantage of our process that the diazotization may be carried out at elevated temperatures such as ambient room temperatures thereby eliminating the ice-cooling problem essential to the usual diazotization reactions.

It is a further advantage that the diazo-cellulose obtained by the process of our invention forms one of the components of a diazotized and developed dye.

It is still a further advantage of the diazo-cellulose of this invention that other types of dyes, such as water-soluble vat dyes, may be combined with the diazo-cellulose.

It is a still further advantage of our novel compositions that they may be printed with various coupling agents comprising arylols, either unsubstituted or substituted, to give colored prints. Discharge prints are also easily effected.

In general, the overall process for the preparation of the novel compositions of the present invention may be simply described. Unmodified cellulose, usually in the form of fibers, is subjected to the following operations. Therein all proportions and percentages are based on the weight of the fiber (OWF), unless otherwise noted. Temperatures are in degrees centigrade.

(1) The unmodified cellulose is treated, as by padding, with an aqueous solution comprising a water-miscible organic liquid, e.g., dimethyl sulfoxide, dissolved isatoic anhydride and a catalyst e.g., potassium acetate, as described in U.S. Patent No. 2,926,063. The wet fabric is then air-dried to remove dimethyl sulfoxide and then heated to react the isatoic anhydride with the cellulose to form a cellulose ester. The dry fabric is then washed to remove unused reactive chemicals. Washing may be carried out by means of hot water or, preferably, by an aqueous solution of a nonionic surfactant. The aqueous solution (wash liquor) is then removed from the esterified material (frequently referred to below as amin-cellulose) by conventional, suitable means. Preferably, the wet material is then dried.

(2) The amin-cellulose is then acidified by passing the fibrous material through an aqueous solution of an acid, preferably at ambient room temperature. The excess acid is then removed by squeeze-rolls or other suitable means.

(3) Without drying, the acid-containing amin-cellulose is passed into, and through, an aqueous solution of an inorganic nitrite, the excess solution of inorganic nitrite removed, and, thereafter, if desired, maintaining a period of dwell to effect the formation of the diazo-cellulose (diazotization).

(4) The unreacted acid and nitrite are then removed by washing, and (5) The diazotized ester of cellulose (diazo-cellulose) is then dried.

As so described, formation of diazo-cellulose from unmodified cellulose according to the present invention appears deceptively simple. However, each of the several steps is important. Each involves certain criteria which within certain ranges must be observed. Therefore, each will be more fully discussed in relation to the problem solved thereby, as well as its place in the overall treatment. By the process, the amin-cellulose is diazotized to form a modified cellulose-diazonium salt (diazo-cellulose) possessing totally unexpected and valuable properties. Most important, no apparent physical damage is imparted to the modified cellulose.

PREPARATION OF THE ESTER-MODIFIED BATH

As noted above, the unmodified cellulose is treated with an ester-modifying bath according to the procedure of U.S. Patent No. 2,926,063. The treating bath may be alkaline or acidic. The product resulting from this treatment is frequently referred to herein as "amin-cellulose."

DIAZOTIZING THE ESTER-MODIFIED CELLULOSE (AMIN-CELLULOSE)

The amin-cellulose is then diazotized. This may be accomplished in a single step or in two steps. The two-step process is a good practice.

In this process, the amin-cellulose is first passed through an aqueous acid solution and a period of dwell maintained to ensure complete wetting of the amin-cellulose by the aqueous acid solution. For light-weight fabrics, one dip and one nip through a pair of squeeze rolls is usually sufficient. For heavier fabrics, four dips and four nips may be required and, for fabrics difficult to penetrate, the amin-cellulose may be skied (passed through the air on rollers) between the dips and the nips.

It is a critical feature of our invention that the amine is converted to an amine-acid product during this treatment and best results are obtained when the period of dwell in the aqueous acid solution is controlled accordingly. Aqueous acid solutions comprising about one to about twenty weight percent real acid usually convert the amine groups to amine-acids when the cellulose contains one ester-amine group per two anhydro-glucose units. The temperature of the aqueous acid bath may range from about 0° C. to about 35° C., ambient room temperature being a good practice.

The acid may be an organic acid such as acetic, oxalic, citric, benzoic, benzenesulfonic, tartaric, phenylacetic, adipic or derivatives thereof. Or, it may be selected from substituted organic acids such as trifluoroacetic, salicyclic, nitrobenzoic, cyanoacetic, mandelic, crotonic, and the like. Inorganic acids including hydrochloric, sulphuric, phosphoric, fluoboric, nitric, fluosilicic, hexafluophosphoric, and sulphurous also may be employed. Acetic, trifluoroacetic, citric, hydrochloric, and oxalic acids are preferred acids.

The acid-wet fibrous cellulosic material is then passed into an aqueous solution of a nitrite. Any nitrate capable of forming nitrous acid with the acid portion of the amine-acid group may be used, the inorganic nitrites causing excellent results to be obtained. Because of its economy, we prefer sodium nitrite.

It is a critical feature of our process that a period of dwell be maintained in the aqueous nitrite solution to diazotize all the amine-acid groups on the cellulose ester. As noted above these groups may range from about one ester per thirty anhydroglucose units to about one ester per two anhydroglucose units. Aqueous nitrite solutions comprising from about one to about twenty weight percent nitrite is a good practice. We prefer to use about five weight percent sodium nitrite in the aqueous solution.

The temperature of the aqueous nitrite bath may range from about 0° C. to 35° C., excellent results being obtained at ambient room temperature. This was unexpected.

During the diazotization the formation of diazo-cellulose causes a yellow color to be imparted to the amin-cellulose. A period of dwell is maintained until this color is uniform. With most fabrics two dips and two nips is a good practice. For dense fabrics, or fabrics composed of hard-twisted yarns, the period of dwell may be achieved by "skying" or by means of a J-box. Periods of dwell may range from about ten seconds to twenty minutes.

In one embodiment of our invention amin-cellulose is entered into glacial acetic acid after which solid sodium nitrite is added and stirred until dissolved. The resulting yellow color imparted to the amin-cellulose indicates diazotization of the amine has taken place.

REMOVAL OF EXCESS ACID AND NITRITE

The diazo-cellulose is first washed with room-temperature water to remove excess acid and nitrite after which the diazo-cellulose is dried. Drying temperatures ranging from 160° F. to about 185° F. (85° C.) cause satisfactory results to be obtained. Drying methods employed may be hot air and the like. The permissible drying temperature, and the stability of the diazo-cellulose to dry heat are controlled to some extent by the type of anion attached to the diazo compound, excellent stability resulting when the anion is obtained from acetic or citric acid.

COUPLING DIAZO-CELLULOSE WITH ARYLOLS

The novel dry diazo-cellulose compositions of this invention are stable over a long period of time, and may be coupled with arylols to produce colored fibrous materials (fiber-dyes).

Coupling is conveniently carried out in neutral solution, preferably at elevated temperatures. When the temperature of the aqueous solution is raised to about 100° C., the time required for coupling is reduced sufficiently to make the process continuous. As noted above the aqueous coupling bath is preferably neutral. When the arylol is sparingly soluble or insoluble in water, an alkylol such as ethanol may be added to the bath. The amount of alkylol may range from 5 to 30% by weight of the aqueous solution. The addition of the alkylol also enables the temperature of the bath to be reduced without adversely affecting the development of the color. No alkali or alkaline salt is added in either of the above cases.

Ravve and Fitko (J. Poly. Science, April 1964, p. 1926) discuss the diazonium coupling reaction. They state that "the diazonium coupling reaction with phenol involves an attack by the electrophilically charged diazo group on the phenoxide ion. (This phenoxide is obtained by the reaction of phenol with aqueous alkali.) The pH of the reaction is the single most important factor affecting the reaction. Coupling will occur most readily and completely in essentially neutral solutions. The diazonium ion becomes, however, quite unstable at neutrality."

Just why the diazonium ion attached to the ester of cellulose in this invention is stable under neutral conditions of drying at elevated temperatures is not understood. Portions of a dried fabric containing a diazonium ion have been heated to temperatures above 100° C. and subsequently coupled to arylols without apparent obvious damage to the diazonium ion.

The invention will be more fully described in conjunction with the following examples which are intended as illustrative. Unless otherwise state, all parts and percentages are by weight.

Temperatures are indicated in degrees centigrade.

EXAMPLE 1

In the following example a portion (approximately 20 g.) of amin-cellulose fabric prepared by the process of U.S. Patent No. 2,936,063 (cellulose anthranilate or cellulose 2-aminobenzoate) is treated with a ten weight percent citric acid solution on a 10-inch Butterworth 3-roll pad (four dips and four nips). The temperature is ambient room temperature. Without drying, the acid-wet fabric is treated on the same padder (four dips and four nips) using five weight percent sodium nitrite at ambient room temperature. During the diazotization step, the formation of the diazonium ion causes the cellulose to acquire a yellow shade. The depth of this yellow color is a rough indication of the number of anhydro-glucose units per diazonium group.

The fabric is then washed with tap water and dried at room conditions. After 24 hours, a portion of the diazo-cellulose fabric is immersed for ten minutes at room temperature in 350 ml. of an aqueous solution comprising ten weight percent β-naphthol dissolved in ethanol during which time the fabric develops a bright orange color. This indicates that coupling has occurred and that the diazo-cellulose has acted as one component of the "fiber-dye."

EXAMPLE 2

In the following example another portion (approximately 20 g.) of the same amin-cellulose used in Example 1, is immersed for ten minutes at room temperature in 350 ml. of an aqueous solution comprising ten weight percent β-naphthol dissolved in ethanol.

No change in the color of the cellulose anthanilate is observed and this indicates that no coupling has occurred since the amin-cellulose, per se, is not reactive until the diazo-cellulose is formed during the diazotization step which was purposely omitted in this example.

EXAMPLE 3

In the following example, a small portion (approximately 20 g.) of an untreated 48 x 48 cotton fabric is treated with 300 ml. of an aqueous solution containing 3.6 weight percent anthranilic acid and 2.92 volume percent concentrated hydrochloric acid using the general procedure of Example 1. The wet fabric is then treated with 165 ml. of an aqueous 5% solution of sodium nitrite for 12 minutes at room temperature.

No yellow color results indicating that the anthranilate is not chemically affixed to the cellulose.

Upon treatment with β-naphthol solution as in Example 1, a reddish-violet tint results instead of the bright orange color obtained in Example 1. This further confirms that the diazotized anthranilic acid coupled to β-naphthol is not chemically affixed to the cellulose.

EXAMPLE 4

The general procedure of Example 1 is repeated using several different acids in the diazotization bath. In each example, the coupling component is β-naphthol. The results are listed in Table 1.

TABLE I

| Cellulose Derivative | Diazotization | | | | | | | Fiber-dye Formed With— | Color Fiber-Dye |
|---|---|---|---|---|---|---|---|---|---|
| | Acid | Conc., Percent | Vol. Used, ml. | NaNO₂, percent | Vol. Used, ml. | Time, min. | Temp., ° C. | | |
| Cellulose-2-aminobenzoate | Trifluoroacetic | 1 | 300 | 5 | 300 | Pad | R.T.¹ | β-Naphthol | Lt. orange. |
| Do | Oxalic | 1 | 300 | 5 | 300 | Pad | R.T.¹ | do | Do. |
| Do | Citric | 1 | 300 | 5 | 300 | Pad | R.T.¹ | do | Do. |
| Do | Acetic | 1 | 300 | 5 | 300 | Pad | R.T.¹ | do | Do. |
| Do | do | 5 | 300 | 5 | 300 | Pad | R.T.¹ | do | Do. |
| Do | do | 10 | 300 | 5 | 300 | Pad | R.T.¹ | do | Orange. |
| Do | do | 20 | 300 | 5 | 300 | Pad | R.T.¹ | do | Very dk. orange. |
| Do | Trifluoroacetic | 5 | 300 | 5 | 300 | Pad | R.T.¹ | do | Orange. |
| Do | do | 10 | 300 | 5 | 300 | Pad | R.T.¹ | do | Dk. orange. |
| Do | do | 20 | 300 | 5 | 300 | Pad | R.T.¹ | do | Do. |
| Do | Oxalic | 5 | 300 | 5 | 300 | Pad | R.T.¹ | do | Orange. |
| Do | do | 10 | 300 | 5 | 300 | Pad | R.T.¹ | do | Deep orange. |
| Do | Citric | 5 | 300 | 5 | 300 | Pad | R.T.¹ | do | Orange. |
| Do | do | 10 | 300 | 5 | 300 | Pad | R.T.¹ | do | Do. |
| Do | do | 20 | 300 | 5 | 300 | Pad | R.T.¹ | do | Deep orange. |

¹ R.T.=Room Temperature.

EXAMPLE 5

In this example the fibrous material is entered into and wet out in an aqueous solution of the acid. A five weight percent solution of nitrite in water is then added slowly to the acid solution containing the fibrous material over periods of time ranging from about 7 to about 30 minutes during which time the diazo-cellulose is formed as may be observed visually by the appearance of the yellow color. The diazotized product is then washed to remove excess reagents, and dried. It is then coupled with an aqueous solution comprising about ten weight percent of an arylol dissolved in ethanol to form the fiber-dye. The results are listed in Table 2.

ever, the dye soluble vat orange 2 (C.I. 59,706) instead of the blue dye of Example 7. The results are as follows:

TABLE 2

| Cellulose Derivative | Acid | Diazotization | | | | | | Fiber dye Formed With 10% | Color Fiber-Dye |
|---|---|---|---|---|---|---|---|---|---|
| | | Conc., Percent | Vol. Used ml. | NaNO₂ Percent | Vol. Used, ml. | Time, min. | Temp., °C. | | |
| Cellulose-2-aminobenzoate [1] | Citric | 10 | 100 | 5 | 100 | Pad | 90 | β-naphthol [2] | Deep orange. |
| Cellulose-6-nitro-2-aminobenzoate | Acetic | 1 | 300 | 5 | 125 | 30 | R.T.[3] | do | Lt. orange. |
| Cellulose-6-chloro-2-aminobenzoate | do | 1 | 300 | 5 | 125 | 30 | R.T.[3] | do | Deep orange. |
| Cellulose-2-aminobenzoate | do | 1 | 300 | 1 | 150 | 30 | R.T.[3] | do | Lt. orange. |
| Do | HCl | 1 | 200 | 1 | 125 | 30 | R.T.[3] | do | Deep orange. |
| Do | Acetic | 5 | 300 | 5 | 125 | 30 | R.T.[3] | do | Orange. |
| Do | Citric | 99.8 | 300 | Δ100 | [4] 10 | 30 | R.T.[3] | do | Deep orange. |
| Do | Citric | 10 | 300 | 5 | 25 | 7 | R.T.[3] | do | Do. |
| Do | HCl | 1 | 300 | 1 | 120 | 30 | R.T.[3] | do | Do. |
| Do | HCl | 1 | 200 | 1 | 125 | 30 | 0 | do | Orange. |
| Do | HCl | 1 | 200 | 1 | 125 | 30 | 10 | do | Do. |
| Do | Acetic | 5 | 300 | 5 | 125 | 30 | R.T. | Phenol | Lt. brown. |
| Do | do | 5 | 300 | 5 | 125 | 30 | R.T. | Catechol | Dk. brown. |
| Do | do | 5 | 300 | 5 | 125 | 30 | R.T.[1] | Resorcinol | Lt. orange. |
| Do | do | 5 | 300 | 5 | 125 | 30 | R.T.[1] | p-Cresol | Med. brown. |
| Do | do | 5 | 300 | 5 | 125 | 30 | R.T.[1] | Hydroquinone | Lt. brown. |
| Do | do | 5 | 300 | 5 | 125 | 30 | R.T.[1] | p-Chlorophenol. | Do. |
| Do | do | 5 | 300 | 5 | 125 | 30 | R.T.[1] | Phloroglucinol | Reddish orange. |
| Do | do | 5 | 300 | 5 | 125 | 30 | R.T.[1] | 8-hydroxy quinolihol ΔΔ | Br. red. |
| Do | do | 5 | 300 | 5 | 125 | 30 | R.T.[1] | 10% thymol | Med. brown. |

[1] Filter paper or wood cellulose.  [2] 2% Solution used here.  [3] R.T.=Room Temperature.  [4] Grams.  Δ=Crystals.  ΔΔ=8.5% solution used here.

EXAMPLE 6

Webbing in the form of Whatman #1 filter paper is converted to an amin-cellulose by the method of U.S. Patent 2,926,063. The dry amin-cellulose is then immersed in a 10 weight percent citric acid solution followed by immersion in a five weight percent aqueous solution of sodium nitrite. The diazotized webbing is then water-washed and air dried. The diazotized product is a diazo-cellulose having the formula

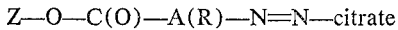

Z—O—C(O)—A(R)—N=N—citrate where A is phenyl and R is H.

After 24 hours, the diazo-cellulose is immersed for two minutes in an aqueous solution consisting of 2 parts β-naphthol, 10 parts ethanol, and 88 parts boiling water. The colored product is then washed in tap water, extracted with 95% ethanol to remove uncoupled β-naphthol, and air dried at room temperature.

The dyed product (fiber dye) has a bright red-orange shade and shows no obvious physical damage. It has the formula:

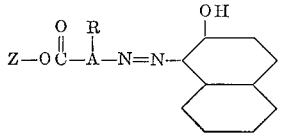

where Z—O is a cellulosate, A is phenyl, and R is H.

EXAMPLE 7

In the following example five grame portions each of untreated cotton, amin-cellulose, and diazo cellulose acetate salt (amin-cellulose diazotized with aqueous acetic acid) are dyed separately in a 10% solution (OWF) of soluble vat blue 5 (C.I. No. 73066). Dyeing is carried out at 90–95° C., with stirring, for about 15 minutes after which time the dyed pieces are tap-water washed for 30 minutes and dried under ambient conditions.

The shade of the dyed diazo-cellulose is a deep yellow-green; that of the amin-cellulose a light pale green; and the untreated cotton is tinted a very pale blue.

The above example is repeated except that all three types of fabric are dyed simultaneously.

Generally, similar results are obtained.

EXAMPLE 8

The procedure of Example 7 is repeated using, however, the dye soluble vat orange 2 (C.I. 59,706) instead of the blue dye of Example 7. The results are as follows:

(a) The shade of the diazo-cellulose is a golden orange;
(b) The shade of the amin-cellulose is a light peach;
(c) The shade of the untreated cotton also is a light peach.

When the three pieces are dyed in the same bath at the same time generally similar results are obtained.

EXAMPLE 9

The procedure of Example 7 is repeated except soluble vat brown 1 (C.I. 70,801) is used instead of the blue dye of Example 7. The results follow:

(a) The shade of the diazo-cellulose is yellow-brown;
(b) The shade of the amin-cellulose is a light tan; and
(c) The shade of the untreated cotton is a light brown.

When the three pieces are dyed in the same bath at the same time, generally similarly results are obtained.

EXAMPLE 10

The procedure of Example 7 is repeated except soluble vat green 1 powder (C.I. 59,826) is used instead of the blue dye of Example 7. The results follow:

(a) The shade of the diazo-cellulose is a yellow-green;
(b) The shade of the amin-cellulose is a red-violet;
(c) The shade of the untreated cotton is a red violet.

The results in the dyeings in Examples 7 through 10 indicate that the colored dye-anion has replaced the acetate anion in the diazo-cellulose salt and chemically combined with the cellulose to give deep (strong) shades. Neither the amin-cellulose nor the untreated cotton produced these results indicating that no chemical combination between the colored dye-anion has occurred.

EXAMPLE 11

An 80 x 80 bleached, unmercerized cotton fabric is converted to amin-cellulose by the process of U.S. Patent 2,926,063. The dry amin-cellulose is then given two dips and two nips in a 10 weight percent citric acid solution and, without drying given two dips and two nips through a five weight percent aqueous solution of sodium nitrite. The wet fabric is then held for about five minutes in a J-box to permit complete diabotization of the amin-cellulose after which it is washed to remove excess chemicals and dried in a hot-air drier, the temperature of the cloth being kept below about 185° F. This product is diazo-cellulose.

A portion of the diazo-cellulose is coupled by the process of Example 6 and a bright red-orange shade is obtained. No evidence of physical damage to the cellulose is observed.

Another portion of the diazo-cellulose is printed in stripes with a roller-printing machine using an alcoholic solution of β-naphthol in a starch-tragacanth thickener. The printed fabric is washed to remove the thickener and the printed stripes are a bright orange-red.

We claim:

1. A dry chemically-reactive cellulose diazonium salt (diazo-cellulose), stable at temperatures up to about 185° F., and having the formula

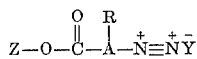

where Z—O is a cellulosate; Y is an acid anion; A is an aryl group; and R is a member selected from the group consisting of hydrogen, nitro, and halogen.

2. The product of claim 1 wherein A is phenyl.
3. The product of claim 1 wherein A is naphthyl.
4. The product of claim 1 wherein R is hydrogen.
5. The product of claim 1 wherein R is a nitro group.
6. The product of claim 1 wherein R is chlorine.
7. The product of claim 1 wherein Y is an acid anion selected from the group consisting of acetate, trifluoroacetate, citrate, chloride, and oxalate.
8. A process for preparing a dry, stable, chemically-reactive cellulose diazonium salt having the formula

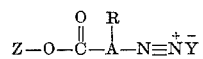

where Z—O is a cellulosate; Y is an acid anion; A is an aryl group; and R is a member selected from the group consisting of hydrogen, nitro, and halogen.

(a) padding untreated cellulose with an aqueous solution containing dimethyl sulfoxide, an isatoic anhydride, and potassium acetate as a catalyst,
(b) air-drying the padded cellulose to remove the dimethyl sulfoxide,
(c) heating the dry cellulose to react the isatoic anhydride with the cellulose to form amin-cellulose,
(d) washing the amin-cellulose in an aqueous solution of a nonionic sulfactant to remove the catalyst and excess reactants,
(e) removing the aqueous solution,
(f) passing the amin-cellulose into and through an aqueous acid solution at ambient room temperature,
(g) removing the excess aqueous acid solution,
(h) passing the acid-containing amin-cellulose into and through an aqueous solution of an inorganic nitrite,
(i) removing excess solution of inorganic nitrite,
(j) removing unreacted acid and inorganic nitrite by water-washing, and,
(k) drying the stable chemically-reactive cellulose diazonium salt (diazo-cellulose) in hot air at a temperature of from 160°–185° F.

9. The process of claim 8 wherein the acid in step (f) is at least one member selected from the group consisting of citric, acetic, trifluoroacetic, oxalic, and hydrochloric acids.
10. The process of claim 9 wherein the concentration of the acid is from about 1 to about 20 weight percent of the solution.
11. The process of claim 8 wherein the inorganic nitrite is sodium nitrite.
12. The process of claim 11 wherein the concentration of sodium nitrite is from about 1 to about 20 weight percent of the solution.
13. The process of claim 11 wherein the temperature of the aqueous sodium nitrite solution is from about 0° C. to about 35° C.
14. The process of claim 8 wherein the nitrite-wet amin-cellulose is maintained at a period of dwell to complete the formation of the diazo-cellulose.
15. The process of claim 14 wherein the period of dwell at ambient room temperature is about from ten seconds to twenty minutes.

References Cited

UNITED STATES PATENTS 2,150,968  3/1939  Guenther et al. ____ 8—116.2 X
2,926,063  2/1960  Reeves et al. _____ 8—116.2

FOREIGN PATENTS 440,964  1/1936  Great Britain.
458,684  12/1936  Great Britain.
531,625  1/1941  Great Britain.

OTHER REFERENCES

Crossley et al., J.A.C.S., volume 62, pp. 1400–1404 (1940).

NORMAN G. TORCHIN, *Primary Examiner.*

JAMES C. CANNON, *Assistant Examiner.*